(12) United States Patent
Allinger et al.

(10) Patent No.: US 6,698,652 B1
(45) Date of Patent: Mar. 2, 2004

(54) METHOD AND ARRANGEMENT FOR OPERATING A MULTISTAGE COUNTER IN ONE COUNTING DIRECTION

(75) Inventors: Robert Allinger, Unterhaching (DE); Robert Hollfelder, München (DE); Wolfgang Pockrandt, Reichertshausen (DE); Armin Wedel, Mering (DE)

(73) Assignee: Infineon Technologies AG, Munich (DE)

( * ) Notice: Subject to any disclaimer, the term of this patent is extended or adjusted under 35 U.S.C. 154(b) by 169 days.

(21) Appl. No.: 09/723,486

(22) Filed: Nov. 28, 2000

Related U.S. Application Data

(63) Continuation of application No. PCT/DE99/01570, filed on May 28, 1999.

(30) Foreign Application Priority Data

May 28, 1998 (DE) ......................... 198 23 955

(51) Int. Cl.⁷ ............................. G06C 27/00
(52) U.S. Cl. ....................... 235/77; 235/60.4
(58) Field of Search .............. 235/60.31, 60.4, 235/61 PE, 77

(56) References Cited

U.S. PATENT DOCUMENTS

| | | | |
|---|---|---|---|
| 3,586,844 A | * | 6/1971 | Hanbicki .................. 708/517 |
| 5,264,689 A | | 11/1993 | Maes et al. |
| 5,381,452 A | | 1/1995 | Kowalski |

FOREIGN PATENT DOCUMENTS

| | | |
|---|---|---|
| DE | 43 02 553 A1 | 8/1993 |
| EP | 0 321 727 B1 | 6/1989 |
| EP | 0 321 727 A1 | 6/1990 |
| EP | 0 618 591 A1 | 10/1994 |
| EP | 0 618 591 B1 | 10/1994 |
| FR | 2 733 615 A1 | 10/1996 |
| GB | 2 187 011 A | 8/1987 |
| JP | 59 123 322 | 7/1984 |
| JP | 02 090 726 A | 3/1990 |

* cited by examiner

Primary Examiner—Karl D. Frech
(74) Attorney, Agent, or Firm—Laurence A. Greenberg; Werner H. Stemer; Ralph E. Locher

(57) ABSTRACT

A method of operating a multistage counter in only one counting direction includes the step of changing a counter reading of a single-stage auxiliary counter at given counter readings of the multistage counter. The single-stage auxiliary counter and the multistage counter can only be changed in one counting direction. Respective counter readings of the multistage counter and of the single-stage auxiliary counter are registered. Values of the respective counter readings of the single-stage auxiliary counter and of the multistage counter are compared with one another, and an indicator signal is generated based on a comparison result determined in the comparing step.

4 Claims, 1 Drawing Sheet

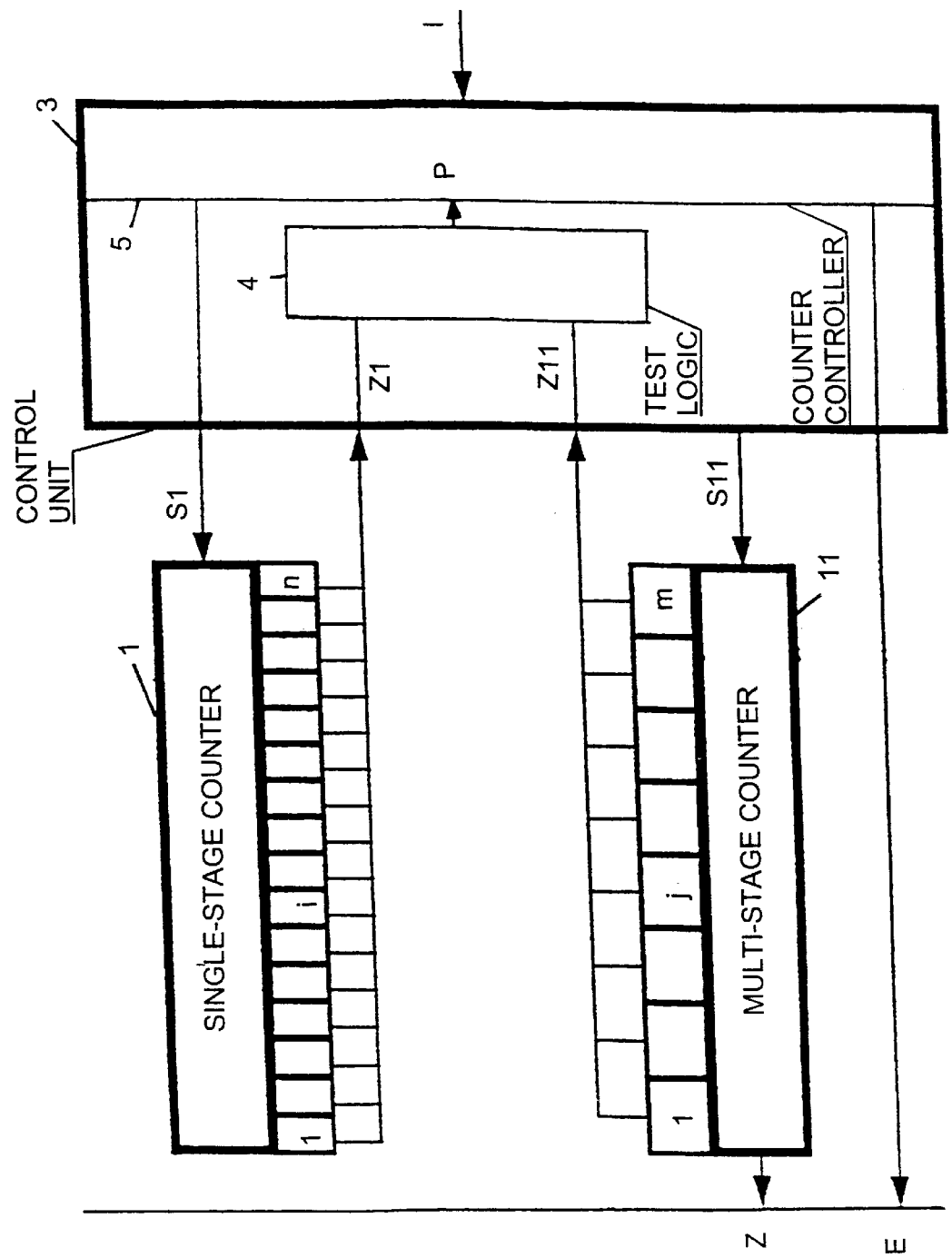

US 6,698,652 B1

METHOD AND ARRANGEMENT FOR OPERATING A MULTISTAGE COUNTER IN ONE COUNTING DIRECTION

CROSS-REFERENCE TO RELATED APPLICATIONS

This application is a continuation of copending International Application No. PCT/DE99/01570, filed May 28, 1999, which designated the United States.

BACKGROUND OF THE INVENTION

Field of the Invention

The invention relates to a method and a configuration for operating a multistage counter in one counting direction.

In many technical applications it is necessary to count events. These events can be the frequency of use of an appliance, the passing of persons or vehicles or objects, and the registration of telephone metering pulses or telephone counting cycles. Such events can also be related to the registration of a vehicle usage, for example in an odometer in an automobile or in an operating hours counter in any appliance. Further, the work hours or attendance time of an employee at his or her workplace may be measured. All these cases are characterized by the fact that they are registered with the highest possible accuracy, that is to say as a rule a high value range of counter readings is covered. In addition, in the aforementioned cases it is generally desired that the counter result is not open to manipulation, that is to say it cannot be reset. Such a requirement may be met reliably by a single-stage counter which can count only upward or downward from its previous counter reading. This may be implemented simply, for example through the use of an EEPROM. It is then necessary to have one EEPROM cell for each counter reading, and the EEPROM must be either only writable or only erasable, depending on whether an upward or downward counting is provided.

The first requirement, namely that the greatest possible value range is to be registered by the counter, then leads to the result that, in the case of such an implementation, an EEPROM memory with an appropriate number of storage cells has to be provided. Expressed in numerical terms, this means that, for example in order to achieve a maximum counter reading of 255, exactly 255 counter cells are needed. However, it is nowadays usual to construct configurations of this type to be as small as possible. The use of a multistage counter with 8 bits, that is to say 8 counter cells, likewise leads to a maximum counter reading of 255. A multistage counter of this type (8-bit binary counter) has the drawback, however, that when there is a change in the next counter digit, the preceding counter digit is reset. This means that a multistage counter which counts only in one direction and at the same time is not open to manipulation can be realized only with great difficulty.

European Patent No. EP 0 321 727 describes a circuit configuration in which a number of EEPROM cells are provided in a row. In this case, a number of rows are in turn connected together. The storage cells of one row in each case constitute a uniform value level. It is possible for the stored contents of one row to be erased by a logical monitoring device only when an overflow into the next higher row has taken place. This conventional configuration exhibits precisely the drawbacks explained above, namely it is open to manipulation, in that unidirectional counting is not ensured with certainty since the logic circuit may be manipulated. A similar but somewhat more complicated configuration is explained in European Patent No. EP 0 618 591. An auxiliary storage cell is provided for rewriting each next higher row. The auxiliary storage cell can be programmed and also erased again. Thus this configuration can also be manipulated easily, since the auxiliary storage cells can be both written and erased.

Japanese Patent Document JP 02 090726 A describes a configuration for measuring a periodic signal, using two counters. The periodic signal is fed to both of the counters, in each case via a respective gate. It can be assumed that the counters are not configured such that they count in only one direction, but can at least be reset, since the configuration is a measuring configuration. The respective opening time of the two counters is different by 1/N. The counter result of one of the counters is indicated by a flashing light until the ratio between the two counter results is likewise 1/N. The result of the one of the counters is then indicated continuously. Consequently, the counter results from the two counters do not depend on each other but on the frequency of the periodic signal and the ratio of the opening times of the two gates.

SUMMARY OF THE INVENTION

It is accordingly an object of the invention to provide a method and a circuit configuration for operating a multistage counter which overcome the above-mentioned disadvantages of the heretofore-known methods and circuit configurations of this general type and which have an increased security against manipulation.

With the foregoing and other objects in view there is provided, in accordance with the invention, a method of operating a multistage counter in only one counting direction, the method includes the steps of:

changing a counter reading of a single-stage auxiliary counter at given counter readings of a multistage counter, the single-stage auxiliary counter and the multistage counter being changeable in only one counting direction;

registering respective counter readings of the multistage counter and of the single-stage auxiliary counter;

comparing values of the respective counter readings of the single-stage auxiliary counter and of the multistage counter with one another; and generating an indicator signal based on a comparison result determined in the comparing step.

According to another mode of the invention, the indicator signal indicates a validity of a counter reading of the multistage counter, if the counter reading of the multistage counter is in a given relationship or is consistent with a corresponding counter reading of the single-stage auxiliary counter.

With the objects of the invention in view there is also provided, a counter configuration, including:

a multistage counter configured as a multistage upward counter or as a multistage downward counter;

the multistage counter having at least a given stage and a succeeding stage following the given stage, a counter reading of the given stage being reset to an initial value when a counter reading of the succeeding stage is changed;

a single-stage auxiliary counter configured as a single-stage upward counter or as a single-stage downward counter, the single-stage auxiliary counter being changed when the multistage counter has specific counter readings; and a comparison device connected to the multistage counter and to the single-stage auxiliary counter, the comparison device performing a comparison between counter readings of the multistage counter and of the single-stage auxiliary counter, and the comparison device supplying an indicator signal corresponding to the comparison.

Due to the simultaneous operation of a single-stage counter which counts only either upward or downward, in addition to the multistage counter, which counts the actual event, and due to the comparison, it is ensured that the counter reading of the multistage counter agrees with the counter reading of the single-stage counter, at least in its order of magnitude. The possibility of manipulation is therefore eliminated with simple measures. If an agreement or correspondence, with a predefined relationship or ratio between the two counters, is not provided, then the indicator signal indicates the lack of validity or reliability. A check is made to see whether the counter reading of the single-stage counter is in a predetermined relationship with the counter reading of the multistage counter. A validity or reliability is provided when the counter readings agree.

Other features which are considered as characteristic for the invention are set forth in the appended claims.

Although the invention is illustrated and described herein as embodied in a method and a configuration for operating a multistage counter in one counting direction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE is a block diagram of the counter configuration according to the invention.

DESCRIPTION OF THE PREFERRED EMBODIMENTS

Referring now to the single FIGURE in detail, there is shown an exemplary embodiment of the invention with an m-stage counter with m=8. In the illustration, this is to be understood as an 8-bit binary counter. The counter 11 is therefore able to count from 0 to 255, that is to say 256 counting digits. The counter 11 is connected to a control unit 3, which feeds the counter 11 with a counting signal S11. Each time the counting signal S11 is fed, the counter 11 is changed by 1, the change taking place in the same direction as a preceding change. This means that the counter illustrated symbolically in the FIGURE is configured in such a way that it counts either upward or only downward. The respective counter reading of the multistage counter 11 is fed as a counter-reading signal Z11 to a test logic 4. Also provided is a single-stage counter 1 which, in this exemplary embodiment, has n cells with n=16. This counter, illustrated symbolically in the FIGURE, is to be constructed in such a way that it also counts only in one counting direction, namely from 0 to 15, that is to say 16 counting digits. The single-stage counter 1 receives a counting signal S1 from the control unit 3, on receipt of which it is incremented by one counting value. The counter reading of the single-stage counter 1 is fed to the control unit 3 as a monitoring counter-reading signal Z1, and thus to the test logic 4. The test logic 4 compares the counter-reading signal Z11 with the monitoring counter-reading signal Z1 and outputs a signal determined on the basis of the comparison to a counter controller 5. The counter controller 5 in turn outputs an error signal E on the basis of the test signal P received from the test logic 4.

The two counters 11 and 1 can be constructed, for example, as EEPROM cells. In this case, provision is made for the individual storage cell to be written or erased in accordance with the rules of upward or downward counting, corresponding to the known operation of a binary counter. In the same way, the single-stage monitoring counter 1 is also composed of EEPROM cells, wherein it is possible for the individual cells 1 to n only to be written or erased one after another.

The typical operation of the configuration illustrated in the FIGURE will now be described. In principle, provision is made for a counting signal S11 to be output by the control unit 3 in response to each input signal I. In this case, the test logic 4 has previously checked the counter readings of the two counters 1 and 11 through the use of the counter-reading signal Z11 and the monitoring counter-reading signal Z1. If both are 0, for example, the test logic 4 determines that there is agreement and, through the use of the test signal P, permits the counter controller 5 to output the counting signal S11.

Provision is now made for both counters to count from 0 to 255. This means that at each sixteenth counting signal S11 which goes to the multistage counter 11, the single-stage monitoring counter 1 likewise receives a monitoring counting signal Si from the counter controller 5 in the control unit 3. For a non-manipulated operation, the test logic is then configured in such a way that it monitors the fact that the counter reading of the counter 11 matches the counter reading just reached by the monitoring counter 1. This means that, in the case of the exemplary embodiment illustrated, the counter reading of the counter 11 must not be less than $(i \times 16)-1$. This is correspondingly true for a configuration which counts downwards; here, too, the counter 11 must be in a range which matches the counter reading of the monitoring counter 1, in accordance with the counting logic.

As soon as the test logic 4 determines that there is no agreement, an error signal E is output.

However, the invention is not restricted to the exemplary embodiment illustrated in the FIGURE. Instead, it is also possible to provide that, in particular in the case of a very large counter-reading range which is to be covered with the counter 11, in order to save counter cells in the single-stage counter, the latter is not operated linearly but, for example, in decades. This means that the single-stage counter would receive a monitoring counting signal S1 from the counter controller 5, for example, at each 10th, 100th, 1000th counting signal S11, and so on. In order to monitor the non-manipulated operation, the test logic 4 must be constructed accordingly, that is to say in such a case the counter reading of the counter 11 must correspond to the order of magnitude associated with the respective counter reading of the monitoring counter 1. It is equally well possible to imagine that the relationship between the counter reading of the counter 11 and the counter reading of the monitoring counter 1 corresponds to a logarithmic, exponential or any other suitable and desired function. This can then be applied both to counter configurations which count upward and to those which count downward.

In conclusion, it should be pointed out that the counter 11 and the monitoring counter 1 do not necessarily have to count in the same direction. Instead, provision can also be made for the one counter to count upward and for the respective other counter to count downward. The sole precondition for non-manipulated operation is that the monitoring counter counts in only one direction and the test logic 4 is constructed in such a way that the counter reading of the counter 11 has a logical relationship with the counter reading of the monitoring counter 1.

We claim:

1. A method of operating a multistage counter in only one counting direction, the method which comprises:

changing a counter reading of a single-stage auxiliary counter at given counter readings of a multistage counter, the single-stage auxiliary counter and the multistage counter being changeable in only one counting direction;

registering respective counter readings of the multistage counter and of the single-stage auxiliary counter;

comparing values of the respective counter readings of the single-stage auxiliary counter and of the multistage counter with one another; and generating an indicator signal based on a comparison result determined in the comparing step.

2. The method according to claim 1, which comprises indicating, with the indicator signal, a validity of a counter reading of the multistage counter, if the counter reading of the multistage counter is in a given relationship with a corresponding counter reading of the single-stage auxiliary counter.

3. The method according to claim 1, which comprises indicating, with the indicator signal, a validity of a counter reading of the multistage counter, if the counter reading of the multistage counter is consistent with a corresponding counter reading of the single-stage auxiliary counter.

4. A counter configuration, comprising:

a multistage counter configured as one of a multistage upward counter and a multistage downward counter;

said multistage counter having at least a given stage and a succeeding stage following said given stage, a counter reading of said given stage being reset to an initial value when a counter reading of said succeeding stage is changed;

a single-stage auxiliary counter configured as one of a single-stage upward counter and a single-stage downward counter, said single-stage auxiliary counter being changed when said multistage counter has specific counter readings; and a comparison device connected to said multistage counter and to said single-stage auxiliary counter, said comparison device performing a comparison between counter readings of said multistage counter and of said single-stage auxiliary counter, and said comparison device supplying an indicator signal corresponding to the comparison.

* * * * *